INVENTORS
CLAUDE V. BELL &
JOSEPH R. TWINAM
BY Joseph L. Black
ATTORNEY

INVENTORS
CLAUDE V. BELL &
JOSEPH R. TWINAM
BY Joseph D. Black
ATTORNEY

United States Patent Office 3,119,901
Patented Jan. 28, 1964

3,119,901

PULSE SIGNAL DEMODULATOR

Claude V. Bell, Levittown, Pa., and Joseph R. Twinam, Maple Shade, N.J., assignors to Radio Corporation of America, a corporation of Delaware Filed May 6, 1960, Ser. No. 27,390
4 Claims. (Cl. 178—88)

Figures 1, 2:
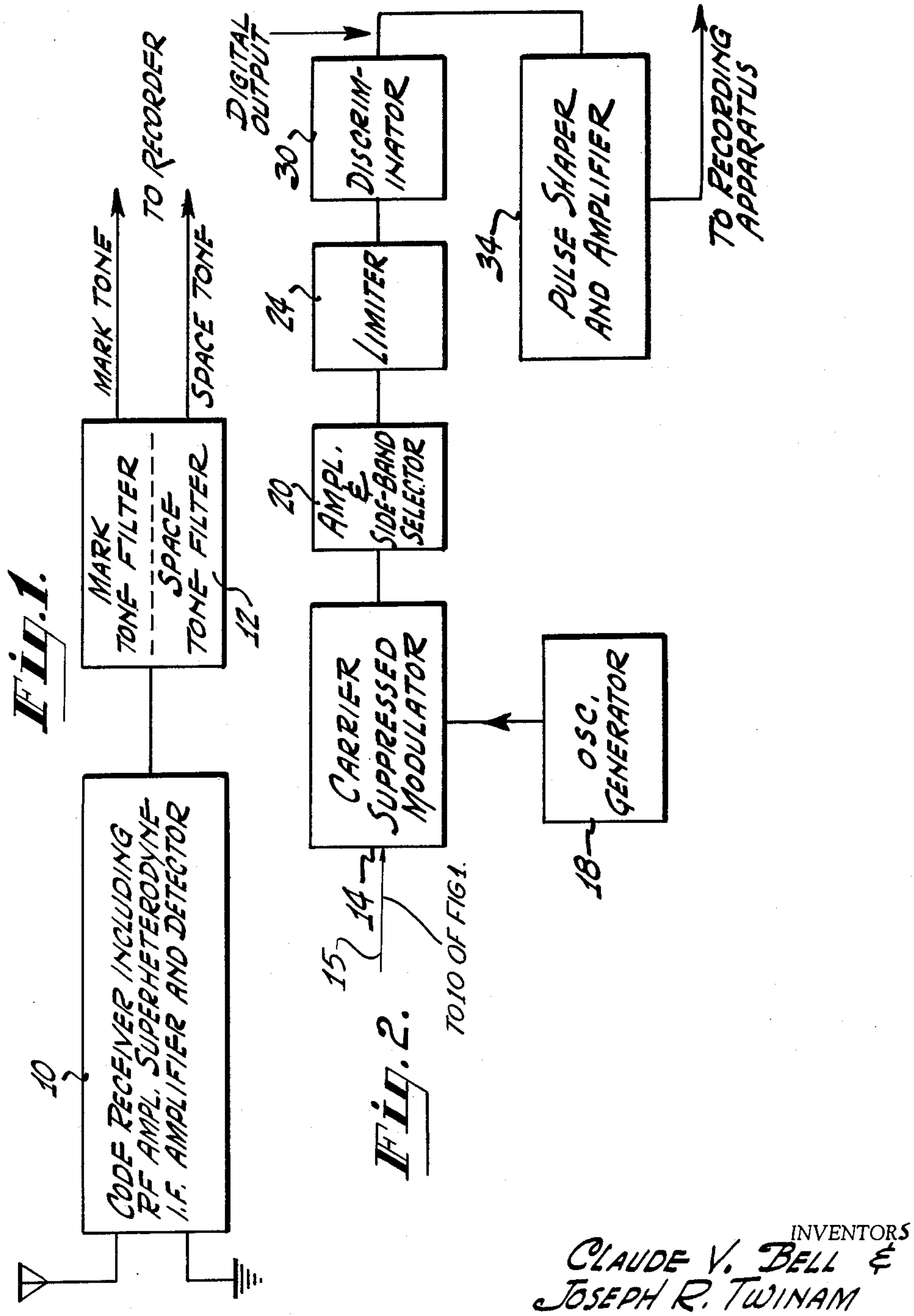

In this application we disclose an improved method and means for processing and demodulating telegraphy and the like signals without decreasing the readability of said signals during demodulation.

In telegraphy and the like systems to be improved by our invention, signal elements are represented by pulses of energy made up of alternating current. In an example, the said information bearing pulse frequencies may be in the tone frequency range, one tone being for "mark" and the other for "space." The mark frequency may be assumed of the order of 6 kilocycles and the space frequency of the order of 3 kilocycles. To simplify the disclosure these assumptions have been adhered to hereinafter. Obviously other tone frequencies may be used. For radio or the like transmission purposes, the mark and space tone frequencies may shift the frequency of a subcarrier used to amplitude modulate the main carrier or the data may be used to shift the frequency of a higher frequency wave at the transmitter. Code transmitters of this type are well known. At the receiver the modulated higher frequency wave is heterodyned down in a first detector and the keyed tones, which in either system appear as substantially constant amplitude tone frequency pulses, are fed to tone or audio frequency filter systems before recording or otherwise using the keyed tones. Other types of modulation by the tones may be used at the sending end and other types of receivers may be modified by our invention at the receiving and recording end. The said receiver may be an amplitude modulated wave receiver of the two sideband and carrier type or may be a single sideband receiver wherein one sideband only is used, or the receiver may be of the frequency shift type as assumed herein.

In such known receivers, the narrow band audio frequency filters used at the detector outputs to select the "mark" and "space" tone frequencies derived by the receiver detecting system "ring" and in so doing change the pulse length. The pulse length may be changed at the inception thereof and at the end thereof, and in practice is often changed at both ends. The carrier intensity vs. tone characteristic of a filter when actuated by a detected pulse is exponential in shape, and filter reaction depends on the intensity of the pulse alteration getting to the filter input first. Here keying or switching of the tones in accordance with signal elements takes place continually to alter the "mark" and "space" frequency magnitudes at their inception and termination to produce a frequency shift keyed (FSK) signal. Accordingly, the tone excitation of the filter may start at different times and points in the tone cycle, and when ringing takes place in the filter the resulting ringing may end at different times, i.e., after a different number of cycles of the ringing frequency which usually is the same as the initiating frequency. In practice, at the filter output, the signal pulse length distortion (delay) at the pulse start is often more than the pulse stretching at the pulse end. Thus "marking" and "spacing" elements become distorted in length and/or position on the time axis.

In certain applications when the keying rate is relatively low, in systems known heretofore this pulse delay or stretching could be tolerated, and these systems worked satisfactorily. However, where these "mark" and "space" pulses are of higher rate and are used to trigger flip-flop circuits actuating recording or message displaying apparatus, this signal delay or stretching is unacceptable. An example is a system of recording that depends on signal length and position for recognition.

The signals to be processed by this invention are digital in form when used as modulation at the transmitter and it is desired to feed digital signals to the recording means at the receiver. Systems known before our invention often do not respond properly because of change in length or position of the signal elements, or both. This change has herein been called "jitter" distortion, which is objectionable in all types of pulse information translating systems.

The receiver of the present invention is used in an automatic ground to air to ground communication system labeled AGACS and called ajax. This is a two-way time division multiplex system using signal elements digital in form. The system includes a central (control) site with storage, logic and controller display and insertion function. There are a number of peripheral sites at which the ground transmitting and receiving equipment, including the receiver of the invention, are located. The control center is connected to each peripheral site by telephone lines over which control signals and messages are sent in both directions. Each aircraft carries a digital transmitter and a receiver arranged in accordance with applicants' invention. All aircraft approaching the aircraft control center are automatically interrogated frequently and the message is displayed on the aircraft. The system on the aircraft automatically responds by transmitting to the interrogating site a reply which is routed back to the control center. The reply includes automatically at least the aircraft altitude. Our invention is not limited to such use.

The general object of our invention is to reduce "jitter" to an extent such that the pulses at our receiver output and recorder input are usable in any type of signal displaying or recording apparatus known today, including the length recognition synchronous systems.

A somewhat more specific object of our invention is provision of a new and improved digital tone pulse translating means for preparing the received pulse for recording in a digital signal recorder.

Because of the particularly exacting nature of certain uses, such as aircraft traffic control, the receiver must be of a very high order of reliability. An object of our invention is to provide a receiver that receives and demodulates the digital message into pulses of proper length separated by intervals of the correct length so that the signal recovered for recording is truly patterned after the signal used as modulation at the transmitter.

Another object of our invention is to provide a signal pulse translating arrangement wherein there is no response delay and no pulse stretching due to narrow filters and wherein the data pulses to be recorded start and stop substantially instantaneously when the transmitted pulse data starts and stops respectively so there is no "jitter" as defined herein.

Briefly, these objects and others are attained in accordance with the present invention by taking the tone pulses from a receiver, such as used by applicants' assignee heretofore, at the detector output ahead of the narrow band tone filters and modulating a higher frequency in a suppressed carrier modulator in accordance with the said tone pulses. From this modulator a side band is selected by a relatively high frequency filter and fed through amplifiers and limiters as desired to a frequency discriminator operating at said higher frequency to recover the tone pulses which are used for recording purposes. In our improved system filtering is done at a much higher frequency. The sideband filter is driven at all times by the sideband selected and any carrier which inadvertently leaks through, and therefore the energy in the filter does not build up and decay as in the receivers heretofore known. The sideband frequency in the example given here is 100 kc.+3000 cycles to 6000 cycles. Many advantages flow from the use of this continuously energized narrow band filter.

One very valuable advantage derived from the use of our improved data processing method and means is the relatively great reduction in the time required for the receiver and recorder to recognize the data arriving in pulse form at the said receiver and/or recorder. Since the frequency of a pulse is relatively high (103 or 106 kc. as compared to 3 or 6 kc.), the wavelength is relatively short as is the time for completion of a cycle thereof and identification of the said frequency and of the data element represented by said pulse of A.C. energy.

While it is thought that applicants' invention and its operation will be clear and understandable to those versed in this art from the foregoing description, applicants will describe an embodiment thereof in some detail. In the following description reference will be made to the attached drawings in the several figures of which like reference characters represent like parts insofar as possible. In the drawing:

FIG. 1 is a block diagram representing receivers now in use in this art; and

Figure 1A:
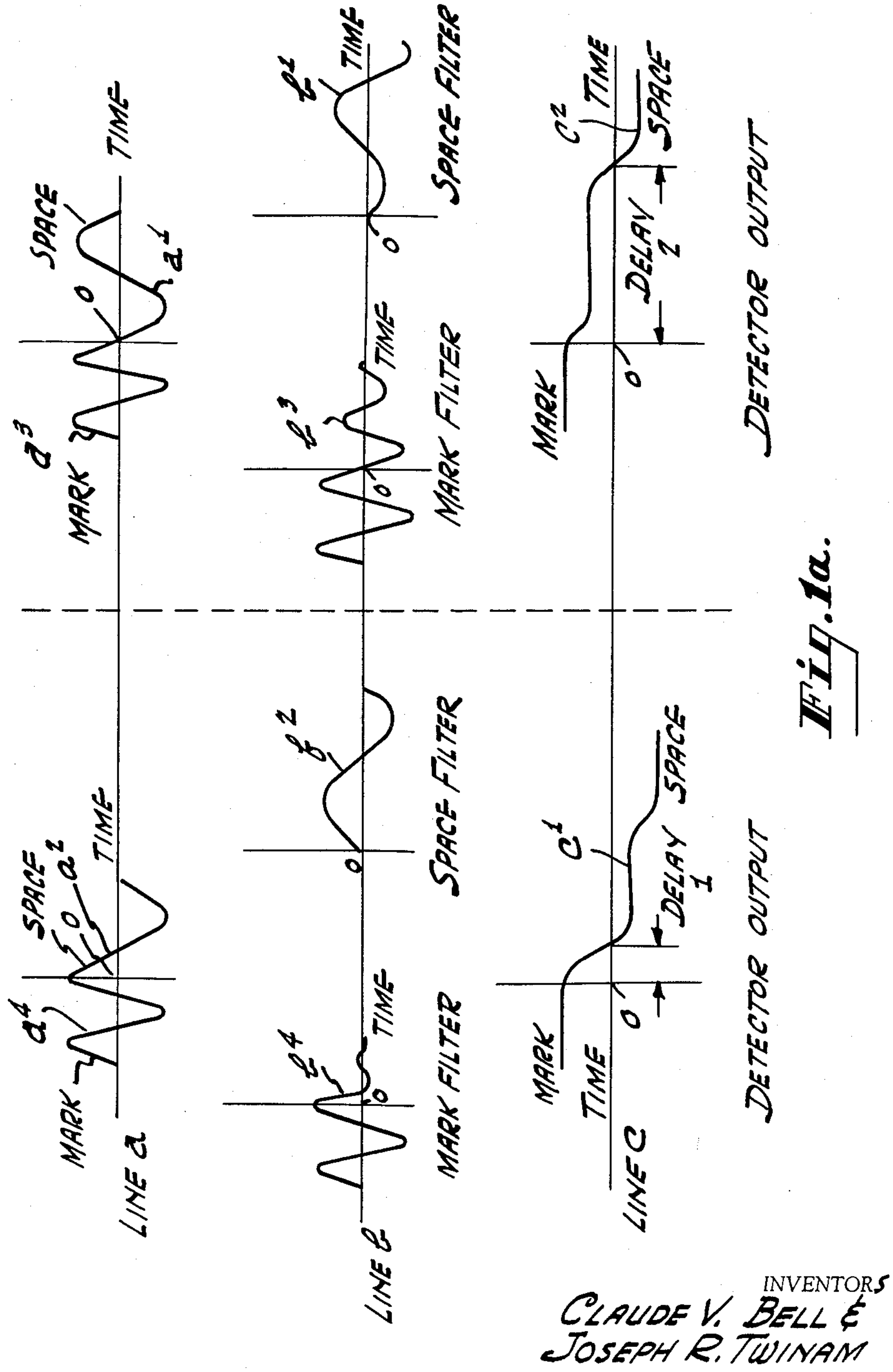

FIG. 1*a*, lines *a*, *b*, and *c* are graphs (not to scale) used to illustrate how pulse inception delay and stretching—"jitter"—occurs in certain prior systems of this nature use heretofore for processing pulse signals.

FIG. 2 is a block diagram representing applicants' improved receiver and the manner in which applicants modify the receiver of FIG. 1.

In FIG. 1, units 10 and 12 together represent a receiver of a type known to applicants which is to be modified in accordance with our invention, as shown in FIG. 2, for use in a high speed digital message system. The unit 10 may include RF amplifiers, a superheterodyne stage, including a local source and mixer, IF amplifiers, and a detector which may be an amplitude modulated wave detector as in the example given, but may be any type of detector that supplies output pulses of tone frequency that alternate, for example, between 6 kc. and 3 kc. and vice versa. Unit 12 represents the tone filters of these known receivers which filters select the alternately present pulses. These filters are relatively narrow band filters for the 6 kc. "mark" pulses and 3 kc. "space" pulses. As used before applicants' invention, the outputs of these filters are detected and recorded. In some systems the alternatively excited detectors have differential outputs wherein, except for the time element, the outputs are of opposed polarity A.C. or D.C.

In accordance with our invention, instead of using the tone filters of unit 12, output from the unit 10 is fed to the balanced modulator 14, by lead 15 as shown by FIG. 2. Since the two tone frequencies only are necessary for use in the balanced modulator 14, this lead or the circuit in 14 might include a simple low pass filter with a cut off at say 9 kc.

Oscillations from a constant frequency source 18 are also supplied to the modulator 14. In the example given these oscillations are of 100 kc. frequency. This modulator 14 may be of any type but preferably is of the carrier suppressed type. That is, the modulator is balanced at the output in respect to the carrier frequency excitation from 18 and unbalanced at the output in respect to the modulation from 10.

A sideband is selected at 20. In an embodiment which gave very satisfactory results, the upper sideband is selected in a band of frequencies extending about from 103 kc. to 106 kc. Some carrier may leak through, but preferably it is a small percentage of the selected power.

If desired, the selected energy may be limited as to magnitude in 24 and is then fed to a frequency discriminator 30 at the output of which the original pulse signal is recovered, in substantially its original form with relatively little delay at the pulse start and little stretching at the pulse end. In other words, free of "jitter".

Systems of the FSK type and others used heretofore have been satisfactory at the relatively slow data rates and keying rates used. However for higher data rates, i.e., bit lengths of the order of 1.33 milliseconds, the narrow tone filters of the prior equipment introduced problems including "jitter" as defined hereinbefore and hereinafter.

In the system to be changed in accordance with our invention, the two tone filters at 12, in FIG. 1, each pass only one tone. The tones appear alternately and are keyed in and out of these narrow filters at a high rate. The filters do not respond instantly to pulse or signal bursts at the filter input. Moreover, pulse energy set up in the filter by the pulse is not shut off uniformly when the pulse ends. This change in response of the two tone filters when keyed pulses are applied is shown graphically in FIG. 1*a*. Two conditions only are shown, one at the left and one at the right of the vertical dash line in FIG. 1*a*. In line "*a*" of FIG. 1*a*, the mark pulses are shown at the left of two vertical axis lines labeled 0 time, which lines represent the keying instant, i.e., where time equals 0 in the keying process, in the two different cases, for switching at signal maximum and at signal minimum. The space cycles are shown at the right of the vertical axis lines labeled 0. No attempt has been made to proportion the cycles to scale. However, the mark cycles appear to be of higher tone frequency than the space cycles. In line "*a*" at the left of the dotted line it is assumed that keying takes place when mark and space tones are of maximum amplitude. In line "*a*", at the right of the dash vertical line it is assumed that keying takes place when the mark and space tones are of minimum magnitude.

The transient response of the filter varies with the phase, magnitude and slope of the tone cycle when switching takes place. To repeat, as shown in line "*a*," switching is assumed to have taken place when the tones (left) are of maximum value and (right) when the tones are of minimum value. Note that the slope is very small, perhaps zero, at zero switching time when keying takes place at the left in line "*a*" and is very steep when keying takes place at the right in line "*a*."

Minimum time is required for the filter energy to reach or build up to full magnitude in the filter when the switching takes place as the tone energy cycle crosses zero magnitude. See the curves $a'$ and $b'$ representing the space tone cycles respectively in lines "*a*" and "*b*" at the right of the vertical dashed line. In order to simplify the showing as much as possible, applicants have disregarded the fact that a current wave at a filter output may be delayed say about 90° in respect to the current wave at the filter input.

Maximum build-up time is required when the burst reaches the filter at a time when the tone cycle is of maximum energy content. This is shown at the left in lines "*a*" and "*b*" respectively by the curves $a^2$ and $b^2$.

When the signal pulse fed to the filter ends, i.e., the pulse is removed from the filttr, the filter output does not always drop to zero immediately. This is known as "ringing" and the energy decay in the filter depends on whether keying takes place as the tone cycle reached maximum magnitude and zero slope or nearly so or keying takes place when the tone cycle reaches zero magnitude and maximum slope or nearly so. The mark cycle shown by curve $a^3$ toward the right in line "*a*" ended at about minimum strength in line "*a*." This frequency decays slowly as shown by curve $b^3$ in line "*b*." Where the keying takes place so that the mark cycle is of maximum strength (zero slope) as shown by curve $a^4$ at the left in line "*a*" of FIG. 1*a*, the tone is of maximum strength at the filter output and dies out rapidly as shown by curve $b^4$ in FIG. 1*a*, line "*b*."

The detected outputs of mark and space tones are shown in line "*c*" of FIG. 1*a*. Note that the detected mark pulse holds over after switching takes place. This detected hold over is considerable when keying takes place when the mark tone is of zero magnitude. The hold over is less when keying takes place when the mark tone is of maximum magnitude. The hold over of the detected tones are shown at Delay 1 and Delay 2 in line "*c*." The space pulse does not build up for some time after keying takes place at maximum magnitude as shown at $c^1$ in line "*c*." The delay in build up of the space pulse in the filter is less when switching takes place at zero magnitude. This is shown at $c^2$ in line "*c*." The distortion or "jitter" in the detected energy is shown as Delay 1 and Delay 2 in line "*c*." The overall jitter from the two detectors is equal to Delay 2—Delay 1. Note here a single detector and single filter is used in our improved means.

In actual tests we have shown that where a receiver having the two tone filters of a known system as in rectangle 12 of FIG. 1 described above is used with tones of 3 kc. and 6 kc. and with 1.33 millisecond bit length, the "jitter" described hereinbefore and shown in line "*c*" of FIG. 1*a* amounted to 70 microseconds.

In applicants' improved system shown by FIG. 2, the tones are mixed with RF carrier and provide a set of corresponding pulses at higher frequencies. They are then passed through a sideband filter as in unit 20 of FIG. 2 driven at all times by sideband energy. This filter does not have the build up and decay problems of the individual tone filters used heretofore.

Tests of our improved signal translators and processing system show that the "jitter" distortion described above can be reduced for example to about 5 microseconds by beating up to 103 kc. and 106 kc. the respective tone signals. This reduced "jitter" distortion is dependent to a material extent on the amount of carrier that is allowed to leak through and be included with the selected sideband. Using a balanced carrier suppressed modulator at 14 gave the improvement described above. In this device there was about 10% carrier distortion at the frequency discriminators. This causes a "jitter" distortion of the output signal of about 20 microseconds and a data distortion of about 3% which is well within the system requirements.

Careful attention to the circuitry should reduce this data distortion to less than 1%.

We have not disclosed details of the modulator in 14, generator in 18, sideband selector or filter and amplifier in 20, amplitude limiter in 24 or discriminator in 30 because we do not claim details of the same herein. In our system we used a preferred oscillator at 18, modulator at 14, amplifier and sideband filter at 20, limiter at 24, and discriminator at 30. The carrier suppressed modulator in 14 may be of the two tube type wherein oscillations are fed in phase to control electrodes from 18 and the tones are fed in opposed phase to control electrodes, and the output electrodes of the tubes are connected together by a coupling impedance such as a transformer primary. The modulator 14 output is amplified and goes through tuned sideband filter stages to a magnitude limiter tube in 24 and then to a Foster-Seely type discriminator in 30 which in practice is followed by a bandpass filter network including diodes for squaring off the pulse tops (±) for use in the recording apparatus. The band pass filter network including diodes is shown as a pulse shaper and amplifier designated 34 on applicants' drawing. As is well known, the rest frequency of the discriminator 30 is set so that a mark tone will produce a pulse of one polarity and a space tone will produce a pulse of another polarity. In the foregoing example, the amplifier and sideband selector 20 passes a frequency of 103 kc. and a frequency of 106 kc.

What is claimed is:

1. In receiving apparatus for receiving pulses in the nature of bursts of one frequency interspersed with pulses in the nature of bursts of a different frequency and for converting said pulse bursts to signals composed of unidirectional pulses having a time duration corresponding to the time duration of said bursts of one frequency interspersed with unidirectional pulses corresponding to the time duration of said bursts of a different frequency, said apparatus comprising a modulator, means for supplying said bursts of one frequency and said bursts of another frequency to said modulator, means to supply a carrier frequency to said modulator to develop a modulated carrier accompanied by upper and lower sidebands derived from said bursts, means for selecting only one of said sidebands, a discriminator responsive to said selected sideband, and a pulse shaper and amplifier including a filter network and pulse limiting diodes coupled to said discriminator for recovering said original pulse signals.

2. In apparatus for separating pulses of a first relatively low frequency energy from pulses of a second relatively low frequency energy without altering the lengths of said pulses, a source of oscillations of carrier frequency, a carrier suppressed modulator having an input connection and an output connection coupled to said source, means to apply said pulses to said input connection of said modulator, a sideband filter for selecting a sideband from said modulator, said sideband filter having an output connection, means coupling said sideband filter to said output connection of said modulator, a frequency discriminator having an input connection and an output connection, means for supplying said signals from said output connection of said filter to said input connection of said discriminator, a pulse shaper and amplifier including a filter network and pulse limiting diodes having an input connection and an output connection for recovering said original pulses, and means coupling said input connection of said pulse shaper to said output connection of said discriminator.

3. In apparatus for separating pulses of a first relatively low frequency energy from pulses of a second relatively low frequency energy without altering the lengths of said pulses, said apparatus consisting of a single channel, said channel comprising a source of oscillations of carrier frequency, a carrier suppressed modulator having an input connection and an output connection, means to apply said pulses to said input connection of said modulator, a sideband filter for selecting a sideband from said modulator, means coupling said sideband filter to said output connection of said modulator, a frequency discriminator having an input connection and an output connection, means coupling said sideband filter to the input connection of said discriminator, a pulse shaper and amplifier including a filter network and pulse limiting diodes, said pulse shaper and amplifier having an input connection, means coupling said input connection of said pulse shaper to said output connection of said discriminator, and an output connection for said pulse shaper and amplifier for recovering said original signal pulses.

4. In apparatus for separating pulses of a first relatively low frequency energy from pulses of a second relatively low frequency energy without altering the lengths of said pulses, a source of oscillations of carrier frequency, a carrier suppressed modulator having an input connection and an output connection coupled to said source, means to apply said pulses to said input connection of said modulator, a sideband filter for selecting a sideband from said modulator, means coupling said sideband filter to said output connection of said modulator, a frequency discriminator having an input connection and an output connection for recovering original pulse signals, means for supplying said signals from said output connection of said filter to said input connection of said discriminator, a pulse shaper and amplifier having an input connection and an output connection, and means for supplying signals from said output connection of said discriminator to said output connection of said pulse shaper and amplifier.

References Cited in the file of this patent

UNITED STATES PATENTS

| | | |
|---|---|---|
| 2,568,408 | Peterson | Sept. 18, 1951 |
| 2 833.857 | Robin | May 6, 1958 |